(12) United States Patent
Overdick et al.

(10) Patent No.: US 7,582,876 B2
(45) Date of Patent: Sep. 1, 2009

(54) ELECTRONIC DEVICE WITH AN ARRAY OF PROCESSING UNITS

(75) Inventors: Michael Overdick, Langerwehe (DE); Walter Ruetten, Linnich (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 311 days.

(21) Appl. No.: 11/568,519

(22) PCT Filed: May 2, 2005

(86) PCT No.: PCT/IB2005/051421

§ 371 (c)(1),
(2), (4) Date: Oct. 31, 2006

(87) PCT Pub. No.: WO2005/107235

PCT Pub. Date: Nov. 10, 2005

(65) Prior Publication Data

US 2008/0244228 A1    Oct. 2, 2008

(30) Foreign Application Priority Data

May 5, 2004    (EP) ................... 04101934

(51) Int. Cl.
*H01L 31/115* (2006.01)
*H01L 27/146* (2006.01)

(52) U.S. Cl. ............. 250/370.09; 250/370.11; 257/59; 257/443; 257/448

(58) Field of Classification Search ............ 250/370.09, 250/370.11; 257/59
See application file for complete search history.

(56) References Cited

U.S. PATENT DOCUMENTS

| 5,949,483 | A | 9/1999 | Fossum et al. |
|---|---|---|---|
| 6,057,539 | A | 5/2000 | Zhou et al. |
| 6,947,086 | B1 * | 9/2005 | Rutten et al. ............... 348/304 |
| 7,282,719 | B2 * | 10/2007 | Mochizuki et al. ..... 250/370.14 |
| 2005/0128326 | A1 * | 6/2005 | Korthout et al. ........... 348/308 |

FOREIGN PATENT DOCUMENTS

| EP | 0757476 A2 | 2/1997 |
|---|---|---|
| EP | 1102323 A1 | 5/2001 |
| WO | WO 03054922 A2 * | 7/2003 |

OTHER PUBLICATIONS

ISR: PCT/IB05/051421.
Written Opinion: PCT/IB05/051421.
ISR: PCT/IB05/051421, Pub. Oct. 11, 2005.
Written Opinion: PCT/IB05/051421, Pub. May 11, 2006.

* cited by examiner

*Primary Examiner*—David P. Porta
*Assistant Examiner*—Casey Bryant

(57) ABSTRACT

Electronics devices like X-ray detectors with an array of pixels are combined (binned) into binning blocks of m×n pixels. Available read-out lines of the device are all connected to different binning blocks, such that up to m binning blocks are addressed simultaneously in the vertical direction when m×n binning is used. In this case, the output signals from the m vertically arranged blocks are distributed over the m read-out columns present in the m×n locks. Row address lines together with diagonal address lines and a simple activation logic provide the required versatile addressing of the pixels.

16 Claims, 6 Drawing Sheets

ELECTRONIC DEVICE WITH AN ARRAY OF PROCESSING UNITS

FIELD OF THE INVENTION

The invention relates to an electronic device with an array of processing units that can be combined ("binned") into binning blocks for external access. The electronic device may particularly be an X-ray detector or an image sensor. Moreover, the invention relates to an examination apparatus with such an X-ray detector, and a method for accessing binning blocks with several processing units in such an electronic device.

BACKGROUND OF THE INVENTION

X-ray detectors with an array of X-ray sensitive sensors as processing units are an important example for the kind of electronic device that is addressed by the present invention. The sensor units of such an X-ray detector are typically arranged in rows and columns, wherein the rows can selectively be addressed by an addressing logic order to couple them to read-out lines running along the columns of the array. Thus the sensor signal of each sensor unit in the array can be read out row by row. In some cases, however, it is not necessary or required to read out the signal of each sensor unit separately, but only the combined signal of several neighboring sensor units, e.g. of a block of m×n units. In these cases, a so-called "binning" is applied, which means that the sensor units of n rows and m columns are coupled together under the control of an appropriate binning circuit. When reading out such an arrangement with the conventional addressing and read-out schemes, sets of n rows can be addressed and read out simultaneously, speeding up the whole read-out process by the factor of n.

SUMMARY OF THE INVENTION

Based on this situation, it was an object of the present invention to provide means for a more versatile and faster read-out of arrays of processing units that can be combined into binning blocks.

An electronic device according to the present invention comprises the following components:

An array of K processing units (K being a natural number), wherein each of the processing units has an internal coupling node and an external coupling node. The internal and external coupling nodes may be different components or points in the circuit of the processing unit, but they may also be the same object. Typical examples for processing units of this kind are radiation sensitive sensor units, particularly X-ray sensor or light sensor units. Moreover, the processing units may be radiation transmitters or emitters, for example pixels of a flat panel display.

A binning circuit for selectively connecting the internal coupling nodes of several processing units each, wherein processing units connected in this way by definition constitute a "binning block". Though the expression "block" suggests a compact, rectangular shape, the geometrical distribution of the processing units that are coupled together in a binning block shall a priori not be restricted in any way and may for example be a sparse distribution of processing units across the whole array. In a typical case, however, the processing units of a binning block will geometrically constitute a rectangular block in the narrower sense of the wording. The shapes and/or numbers of members may in general be different for different binning blocks, though in a typical case they will be equal for all binning blocks of an array.

An addressing circuit for selectively addressing processing units that shall externally be accessed. In a radiation sensing device, the access to a processing unit will typically comprise the reading out of sensor signals. In a radiation transmitting or emitting device, the access to a processing unit will typically comprise the control of a color and/or intensity of a luminescent pixel.

A number of M<K signal lines, wherein the external coupling node of each processing unit can selectively be connected to just one of said signal lines under the control of the aforementioned addressing circuit. This control by the addressing circuit is executed in such a way that each of the M signal lines is (uniquely) coupled to a different binning block. In this context, the "coupling to a binning block" means that the signal line is connected to at least one external node of the processing units of said binning block.

An electronic device of the kind described above has the advantage that it can be accessed with optimal speed as all available M signal lines access different binning blocks in one step of an addressing procedure. In contrast to this, the read-out procedures of known X-ray detectors often do not make use of all read-out lines in one read-out step during binning because in many cases all read-out lines that run through the same addressed binning block are coupled to that block and therefore carry redundant signals or only one of said lines is coupled to the block and the rest of the lines remains idle.

Though the processing units of the array may in principle be arbitrarily disposed, it is preferred that they are arranged in n rows and m columns, i.e. in a matrix. Moreover, the signal lines are designed such that they can selectively be connected to the processing units of a different column each. This corresponds to a conventional design of X-ray detectors, wherein the read-out lines run along the columns of a matrix with switchable connections to all pixels of that column.

In the aforementioned matrix arrangement, the internal coupling nodes of the processing units of each column of the array are preferably connected to each other in series via a corresponding column line, wherein a switch is disposed between each pair of processing units in said column line, and wherein said switches can be controlled by "binning control lines" that run along the rows of the array. Activation of such a binning control line then activates all switches at the height of a certain row and therefore couples processing units that belong (i) to the same column and (ii) to said row and its neighboring row. The binning control lines therefore allow for a row-wise binning in the array.

According to an embodiment of the binning circuit that is analogous to the aforementioned one, the internal coupling nodes of the processing units of each row of the array are connected to each other in series via a corresponding row line, wherein a switch is disposed between each pair of processing units in said row line, and wherein said switches can be controlled by "binning control lines" that run along the columns of the array. Activation of such a binning control line then activates the switches at a certain column and therefore couples processing units that belong (i) to the same row and (ii) to said column and its neighboring column. The binning control lines therefore allow for a column-wise binning in the array.

According to another preferred embodiment of the invention, the addressing circuit comprises row address lines that run along the rows of the array and that are connected to a "selection logic" which is present in each processing unit of the corresponding row. In many conventional designs of X-ray detectors, each processing unit is validly addressed if the corresponding row address line is activated. In contrast to this, the activation of a row address line in the present embodiment only determines one input of a selection logic. The selection logic may therefore be provided with further signals in order to control the addressing of the processing elements more versatile, namely not only in dependence on their row number. The processing units could for example contain a one-bit memory that is connected to a selection logic which implements a logical AND; in this case the contents of the memory would determine if activation of the corresponding row address line is able to activate the processing unit or not. In such an embodiment any pattern of processing units to be activated by row address lines can be implemented in the array by preparing the memories accordingly.

In a preferred further development of the aforementioned electronic device with row address lines, the addressing circuit further comprises diagonal address lines that are connected to said selection logic in each processing unit of a corresponding diagonal line system of the array. A "diagonal line system" of a matrix array shall be understood in the present context as a sequence of one or (if applicable) more lines that (i) starts at a first border of the array which is not longer (in terms of row number or column number) than the other borders, (ii) runs diagonally through the array until a second border is reached, (iii) if necessary makes a jump to the border opposite to the second border and continues its diagonal run from there until again a border is reached, (iv) ends if it reaches the border that is opposite to the first border. The ordinary diagonal of a quadratic matrix that runs from one corner to the opposite one is a special case of a "diagonal line system". In the general case, however, a diagonal line system must comprise at least one jump to an opposite border in order to remain inside the array when running from a starting border to the opposite one. In the described embodiment, each selection logic receives inputs both from a diagonal address line and a row address line. The selection logic is furthermore adapted to connect the external coupling node of that processing unit to the corresponding signal line if and only if both the row address line and the diagonal-line are activated. In other words, the selection logic implements an AND logic between the connected diagonal address line and row address line. As will become apparent from the detailed descriptions of the Figures, such an addressing circuit can be exploited to achieve the desired coupling of M binning blocks to different signal lines.

In a further development of the aforementioned embodiment and the embodiment with binning control lines that run along columns of the array, each diagonal address line is connected to one of said binning control lines. Moreover, the effect of a signal on the binning control lines (for example a high or low voltage) should be different with respect to the activation of switches via the binning control lines and the control of the selection logic in the processing units. A logical "0" on a binning control line should for example imply that the corresponding switches are opened (which means that binning blocks are separated at the corresponding column of the array), while said logical "0" should at the same time be an activating input for a selection logic.

According to a further development of the electronic device, the binning circuit comprises at least two sets of registers, wherein each set of registers stores a pattern of binning blocks. A set of registers (e.g. shift registers) can be used to determine the signal levels (for example high or low voltage) that shall be applied to binning control lines which run along a row or a column of the array. If two of such sets of registers are used, in both of them a (different) pattern of binning blocks can be stored which allows a fast switching between different binning patterns by simply changing the set of registers which is coupled to the binning control lines.

While the main task of the binning circuit is to couple internal nodes of processing units, it may further be adapted to couple also external nodes of some or all processing units of a binning block. Preferably, only the processing units of one row of a binning block are coupled in this way. The coupling of external nodes has the advantage that they can all be accessed by one and the same signal line.

According to a further development of those embodiments of the invention which comprise a selection logic in every processing unit, the binning circuit is further adapted to couple also the selection logics of processing units of a binning block that correspond to the same signal line. In particular the outputs of the selection logics may be coupled in this way. The coupling of the selection logics means that the valid activation of one selection logic simultaneously implies the activation of all processing units that are coupled in this way. In a matrix arrangement of the kind described above, the activation of one selection logic in one processing unit may for example imply the simultaneous activation of all processing units of the same binning block that lie in the same column, i.e. that couple to the same signal line running along that column. By such a coupling of several processing units to a corresponding signal line, the quality of signal transmission can be improved.

Large arrays of processing units such as solid-state X-ray detectors are often produced by mask stitching, i.e. the repetition of a given mask in a periodic pattern. Therefore, the layout of an electronic device according to the present invention preferably is made compatible with such a mask stitching. Further details relating to this embodiment will become apparent from the description of the Figures.

The invention further comprises an X-ray detector that contains an electronic device of the kind described above, wherein the processing units are X-ray sensitive sensors. Moreover, the invention comprises an image sensor which contains an electronic device of the kind described above, wherein the processing units are sensors which are sensitive to photons of visible light, ultraviolet (UV) and/or infrared (IR). Such an image sensor may for example be used in digital cameras.

The invention also comprises an examination apparatus with an X-ray tube for the generation of X-rays and with an X-ray detector of the aforementioned kind. Such an apparatus may particularly be used for medical applications or for materials testing.

Finally, the invention comprises a method for accessing binning blocks which comprise several processing units in an electronic device with an array of processing units and a set of M signal lines. The method comprises the addressing of the processing units of the array in such a way that each of the M signal lines accesses a different binning block. The method comprises in general form the steps that can be executed with an electronic device of the kind described above. Therefore, reference is made to the preceding description for more information on the details, advantages and improvements of that method.

These and other aspects of the invention will be apparent from and elucidated with reference to the embodiment(s) described hereinafter.

BRIEF DESCRIPTION OF THE DRAWINGS

In the following the invention is described by way of example with the help of the accompanying drawings in which.

DESCRIPTION OF PREFERRED EMBODIMENTS

The devices that are shown in the Figures may be X-ray detectors (e.g. for medical applications) or image sensors (e.g. for digital photography). Flat X-ray detectors are known, based for example on amorphous silicon or crystalline silicon (CMOS) technology. Image sensors for digital photography and similar applications are often based on so-called CMOS imager chips. In all these sensors the sensing elements (sensor units, pixels) are usually arranged in a matrix, which is addressed row-wise by a scanning logic. The signal acquisition from the pixels is achieved through read-out electronics, often column amplifiers, multiplexers and additional electronics.

Pixel binning is a known technique to increase the read-out speed, reduce the data volume and, in some cases, to increase the signal to noise ratio of an imaging sensor. Generally, m×n binning means the combination of m pixels in the horizontal direction and of n pixels in the vertical direction. Very often an n×n (square) binning is used. The binned pixels are sometimes referred to as a "binning block" or just "block".

Figure 1:
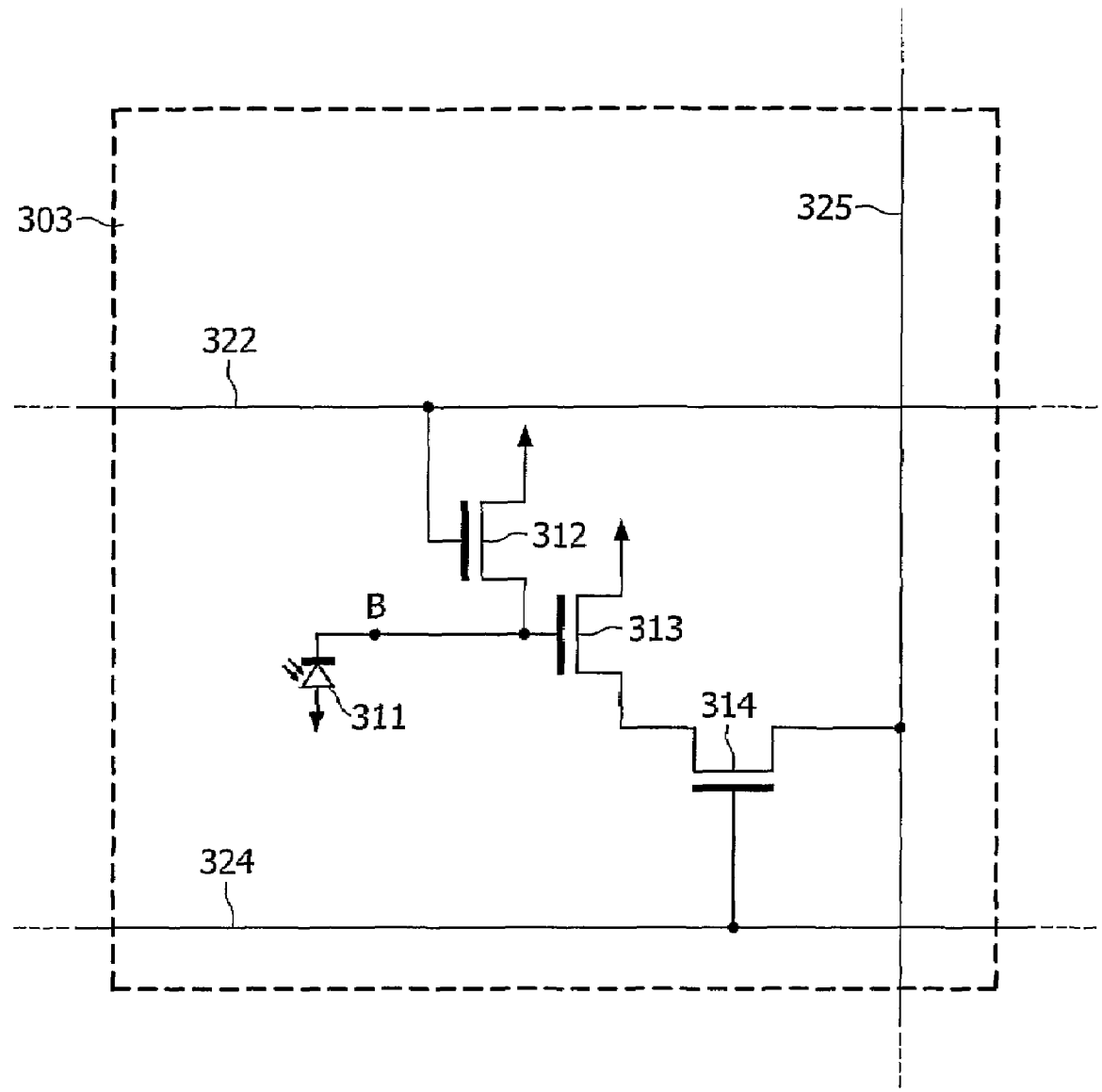
FIG. 1 shows a sensor unit according to the state of the art.
Figure 2:
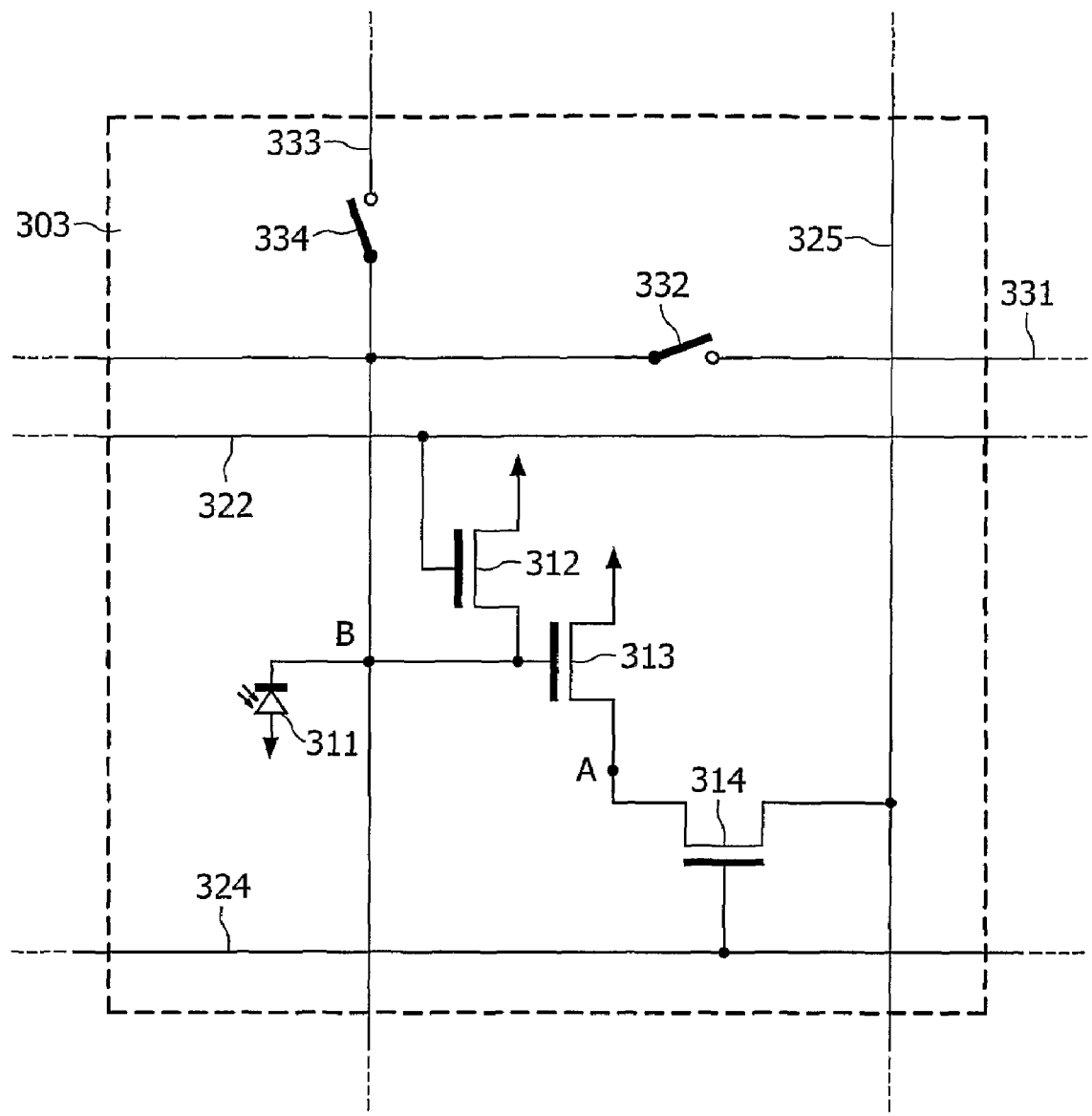
FIG. 2 shows a sensor unit with binning capabilities according to the state of the art.
Figure 3:
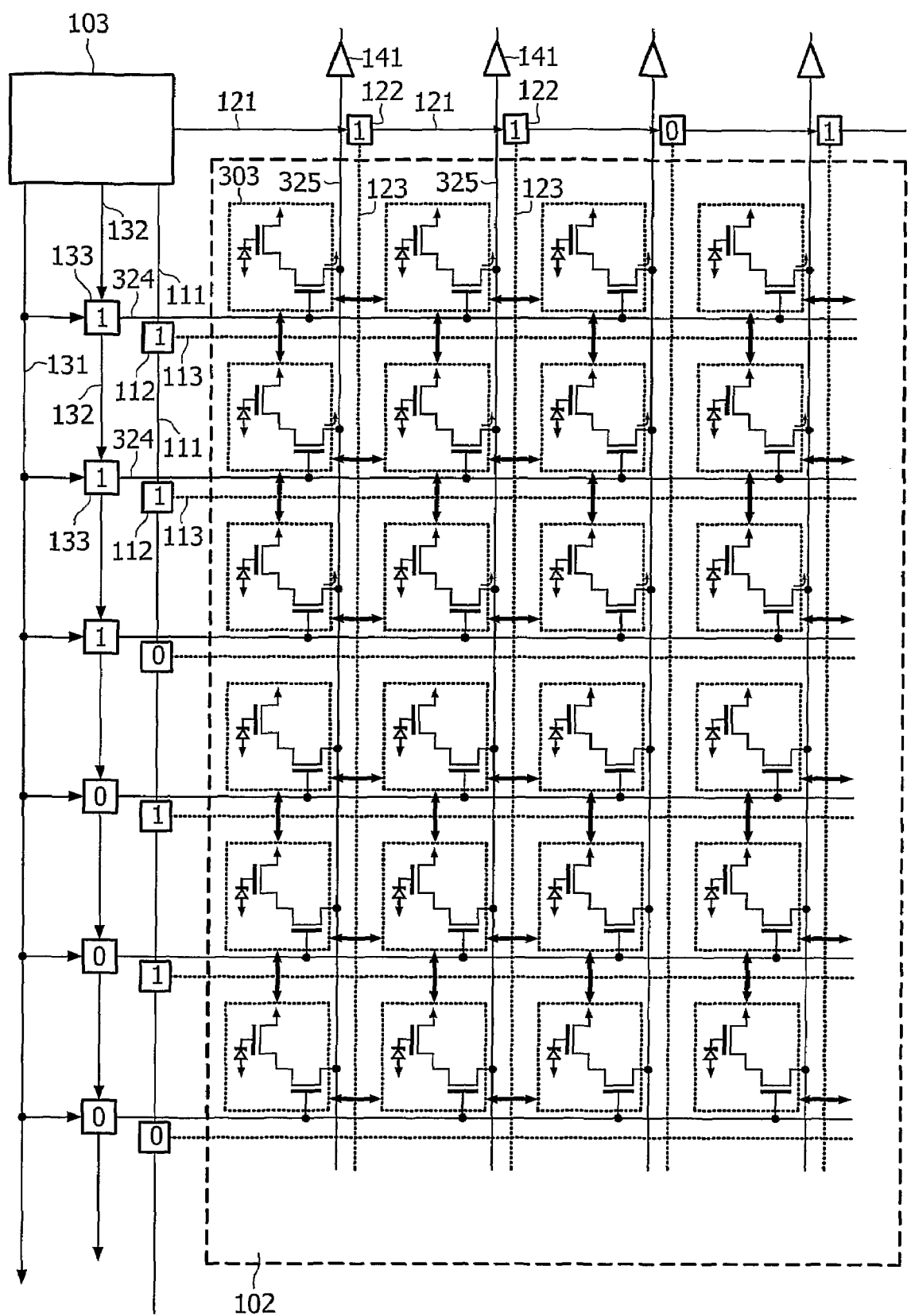
FIG. 3 shows the connection of sensor units according to FIG. 2 to binning control lines.

The standard way of pixel binning is illustrated in FIGS. 1 to 3. FIG. 1 shows a generic CMOS imager pixel 303 with photodiode 311, reset switch 312, source follower transistor 313 and read-out switch 314. (The transfer gate present in many pixel circuits between the photodiode and the gate of the source follower is not shown here.) For pixel binning in such a configuration, the gates of the source follower transistors are of crucial importance. They are called the "pixel nodes" or "internal nodes" B. All pixel nodes B of the pixels to be combined have to be connected together as indicated in FIG. 2. The connections are achieved by a matrix of horizontal and vertical lines and switches (331, 332 and 333, 334). By connecting the pixel nodes B, the signal charges are distributed between the pixels, so that effectively the average signal can be read out via the source followers. In principle, reading the voltage at the source of one source follower suffices, but practically the sources are also connected together, at least in the vertical direction. This is achieved on the read-out lines 325 when the pixels are addressed.

FIG. 3 shows a common way of how arrays 102 with pixel binning are addressed. There are two shift registers 122 and 112, which control the horizontal and vertical binning switches 332 and 334 respectively. A zero value in such a shift register cell determines the boundary between two binning areas. The addressing of the read-out switches is controlled by the shift register 133 in a row by row fashion. The shift register cells 133 are equipped with an output enable to activate the read-out switches with a global read-out signal 131.

The problem with the binning scheme described above is the sub-optimal read-out speed. If an m×n binning (m columns and n rows) is used, the read-out speed increases only by a factor of n compared to the un-binned case. This speed gain of n is due to the fact that n rows are addressed and read out in parallel. However, this "linear" speed gain is sub-optimal, as only one in m columns is needed to read the signal from the m×n binned region. The other m−1 columns carry the identical, redundant information. Usually the corresponding electronics are idle.

The present invention aims at overcoming the sub-optimal read-out speed by using a binning scheme which allows a speed gain of m×n for an m×n binning thus making use of the full capacity of the existing read-out electronics.

The idea of the invention is to address up to m binning blocks simultaneously in the vertical direction when m×n binning is used. The output signals from the m vertically arranged blocks are distributed over the m read-out columns present in the m×n blocks.

Advantages of the invention are the aforementioned speed gain of m·n for an m×n binning while keeping the addressing and operation simple. The invention allows binning with many different values of m and n for the same detector. For the usual square binning (n×n), the speed gain is quadratic ($n^2$) as compared to linear (n). Concerning fault tolerance, for broken read-out lines the resulting defect pattern is benign since only every m-th binning block in the vertical direction will be affected. Furthermore the proposed scheme also allows operation in the traditional binning modes (backwards compatibility/fallback mode for certain defect conditions).

Although the task addressed by the invention is non-trivial, the technical measures are relatively few and simple as compared to the prior art. This is shown also by the practical embodiment described in the following. Furthermore, the invention is compatible with standard technology used in the production of imaging sensors, such as stitching of matrix blocks and possibly a limited number of metal layers in the pixels.

Figure 4:
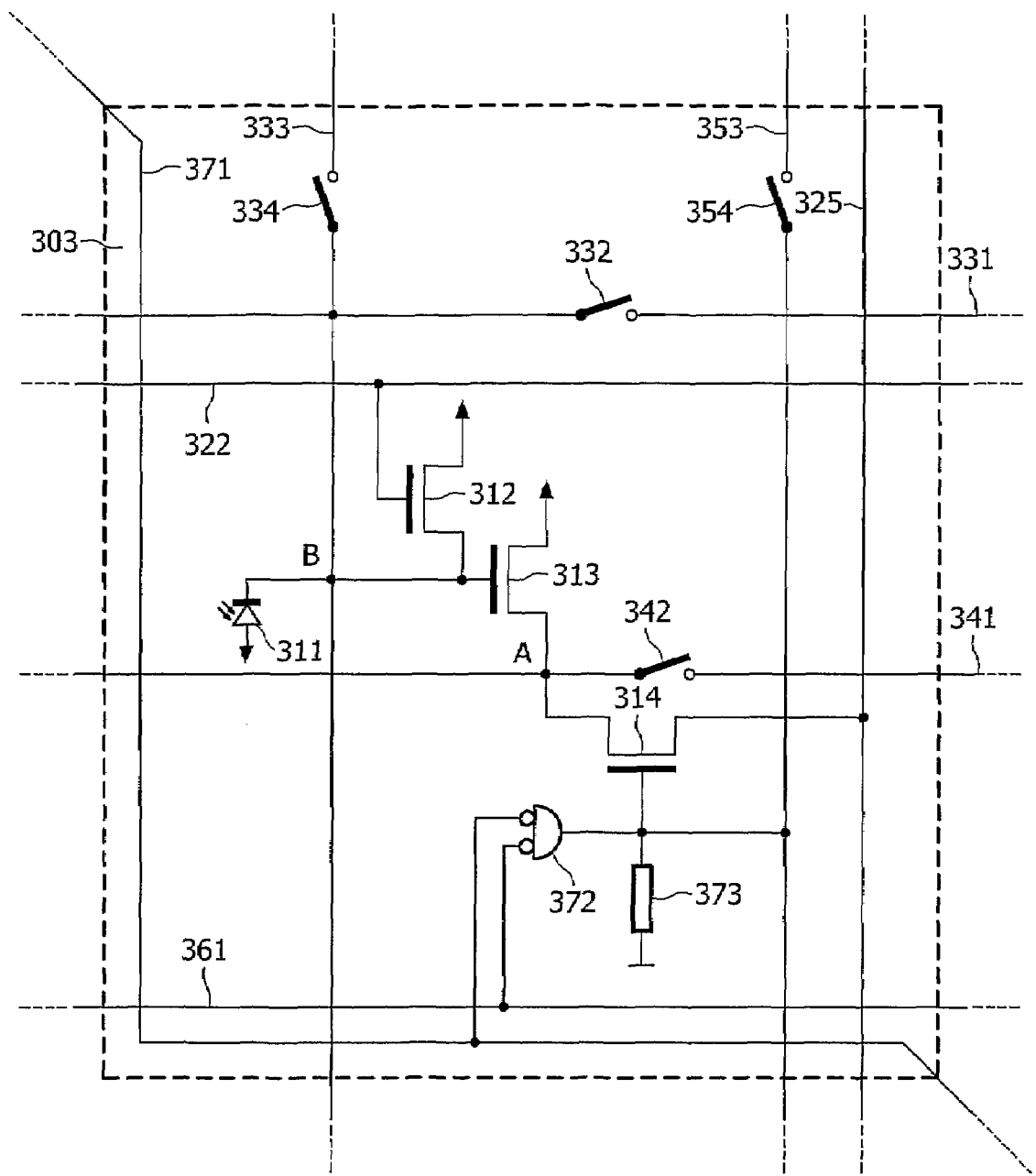
FIG. 4 shows a sensor unit with binning capabilities according to the present invention.
Figure 5:
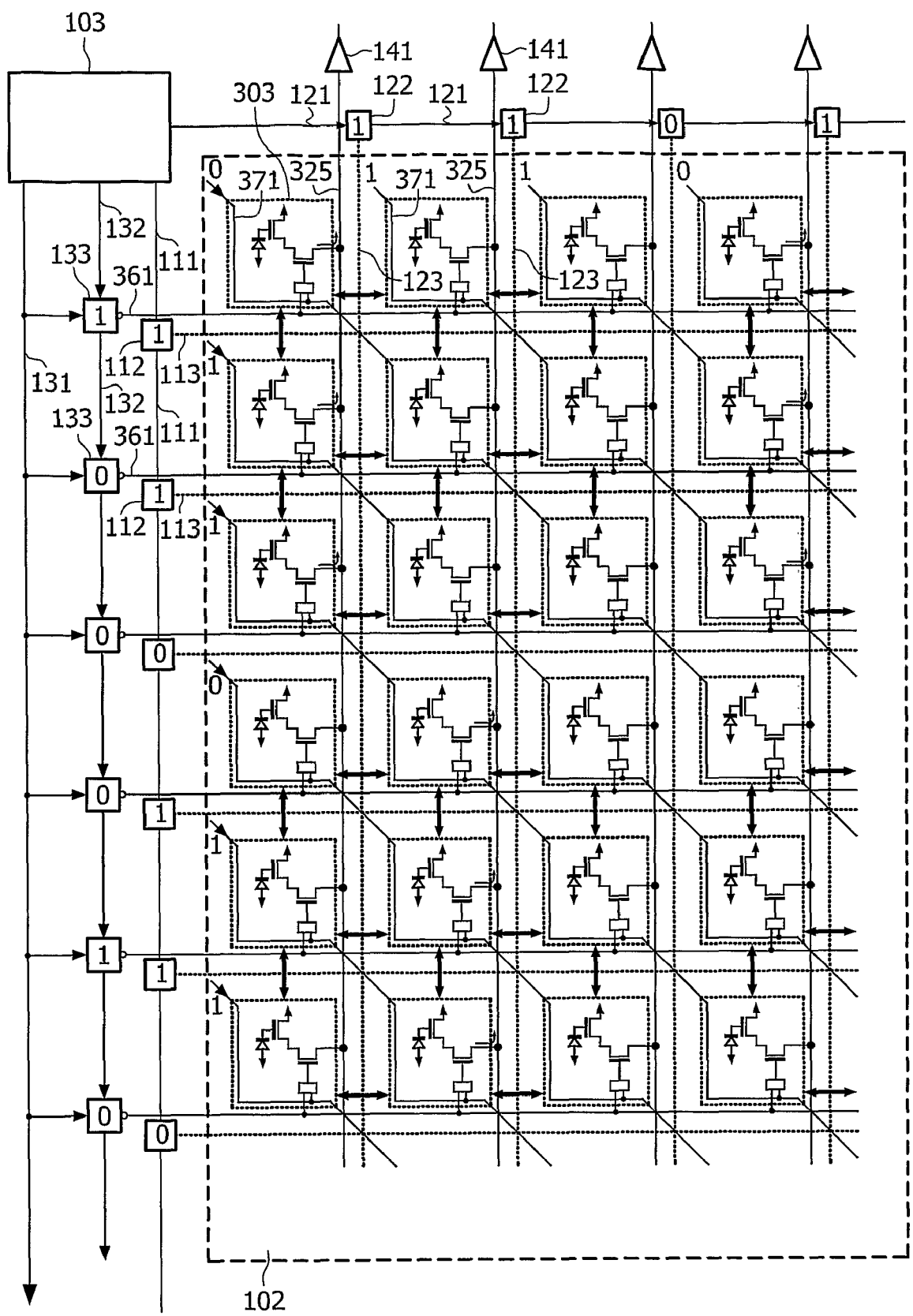
FIG. 5 shows the connection of sensor units according to FIG. 4 to binning control lines.
Figure 6:
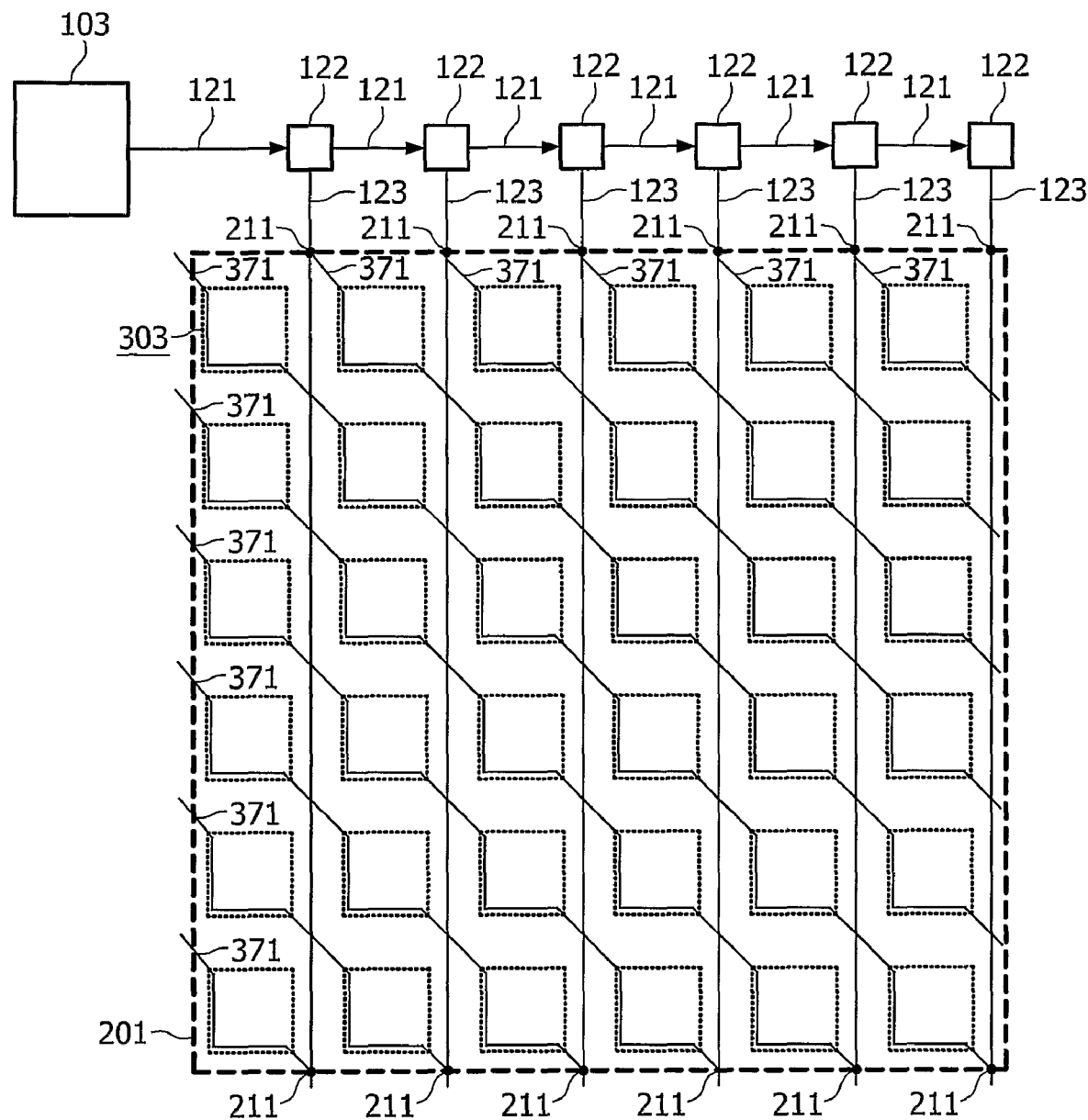
FIG. 6 shows the connection of diagonal address lines in a device according to FIG. 5 in more detail.

A preferred embodiment of the invention is drawn in the example in FIGS. 4-6. FIG. 4 shows a pixel circuit which has the following additional components (compared to FIG. 2):

341: horizontal connection line for the sources of the source followers 313
342: connection switch (also controlled by the horizontal shift register 122 (in FIG. 5))
353: vertical connection line for the gates of the read-out transistors 314
354: connection switch (also controlled by the vertical shift register 112 (in FIG. 5))
361: row address line (replacing line 324 from FIG. 2)
371: diagonal address line
372: logic gate or "selection logic" (open drain, high impedance for logic "0")
373: pull-down device.

In a binning block the sources of the source followers (or the "external nodes A" of the pixels) are connected horizontally using lines 341 and the switches 342. The vertical connection lines and switches (353, 354) together with the pull-down devices 373 form a wired-or connection for the gates of the read-out transistor 314 in the vertical direction. This means, if one read-out transistor is activated by the logic gate 372, all the read-out transistors in the same column in the binning block will also be activated. The activation logic formed by the row address line 361, the diagonal address line 371 and the logic gate 372 is at the heart of the present embodiment.

As mentioned before, a basic idea of the invention is to address several binning blocks simultaneously also in the vertical direction when pixel binning is used: The output signals from these vertically arranged blocks have to be distributed over the read-out columns present in the binning blocks. The difficult task is to configure the possible connection schemes if many binning block sizes are allowed. The decision which pixels should be connected to the read-out line running through them cannot be based on the column or row information alone, but only on a combination. One possible method to achieve this is to add a memory cell (e.g. shift register) in every pixel and to write a full "read-out mask" specific to the binning mode into the complete array.

In the embodiment shown in FIGS. 4-6 the task is solved by using only the existing shift registers (already shown in FIG. 3). The main measure is to add the diagonal address lines 371 to the array. Together with the row address lines 361 and the logic gate 372 they establish the special addressing scheme needed for this task. For the logic convention chosen here, the read-out switch in a pixel will only be activated if both the diagonal address line and the row address line have logic levels "0" (In order to keep the conventional meaning of the contents of the shift registers 133, their outputs therefore comprise an inverter, see FIG. 5 in comparison to FIG. 3). In the preferred embodiment shown here, the diagonal address lines are fed from the horizontal binning shift registers 122 according to the scheme drawn in FIG. 6. As can be seen from FIG. 6, a diagonal address line (with the exception of the genuine diagonal of the array) comprises an upper section starting at the upper border of the array in a node 211 and a lower section starting at the lower border of the array in a node 211, the two mentioned nodes 211 lying vertically above each other. This layout guarantees that every diagonal address line crosses every row and every column exactly once. For every binning block separator (a logical "0" in a register 122), there will be a diagonal address line also at "0" thus potentially enabling the read-out switches in the pixels along this diagonal.

A practical configuration for a 3×3 binning is shown in FIG. 5. For clarity, the action of the vertical and horizontal shift registers 112 and 122 in the pixels are indicated only with bold arrows. According to the previous description they mean:
Horizontal bold arrow:
Switch 332 active: horizontal connection of pixel nodes
Switch 342 active: horizontal connection of source follower outputs Vertical bold arrow:
Switch 334 active: vertical connection of pixel nodes
Switch 354 active: vertical connection of read-out switch gates (wired-or)

The 3×3 binning structure is given by the content of the shift registers 112 and 122. The bold arrows show the connected 3×3 pixels. The bit pattern in the row address shift registers 133 together with the bit pattern on the diagonal address lines 371 activate the logic gate in the first row/first column (counting from the top), in the first row/fourth column, and in the fifth row/second column. (Mentioned here are only the activated logic gates for the pixels shown in FIG. 5. There will be more activated logic gates in other parts of the array.) Due to the wired-or logic in the binning blocks, more read-out switches are activated. This is shown in the drawing by the bent arrows indicating signal flow from a pixel onto the read-out line 325 connected to the column read-out amplifier 141. For example, the outputs of all pixels in the first three rows are connected to the first read-out column. FIG. 5 thus indicates how the time efficient read-out of the binning blocks is achieved.

The operation for square shaped binning blocks of n×n follows in a straightforward way for any given n from generalizing the previous description. Also the operation without binning (=1×1 binning) is clear, actually being the usual "one row at a time" read-out scheme. Also for rectangular binning blocks of m×n pixels the read-out is achieved by using appropriate bit patterns in the row address registers 133. Again, the read-out will be time efficient as all m read-out lines running through the binning block will be utilized.

A further possibility is to use the non time efficient read-out known from the prior art (e.g. as a fall-back mode or under certain fault conditions). For example, in the 3×3 binning case, the row address register 133 would contain three (and only three) consecutive "1" entries, thus enabling all outputs in a binning block to be connected to all three read-out lines running through the binning block. The examples given in this paragraph illustrate the versatility of this addressing scheme.

For fast scanning of the array and "clean operation" the row address shift registers 133 are equipped with a global output enable (line 131). This allows shifting through the row address pattern for all schemes described above and having the outputs disabled during this shifting action to avoid wrong read-outs.

All registers are loaded and clocked by the control logic 103 shown in FIGS. 3 and 5.

A useful variation allowing very fast mode switches would have two or more horizontal and vertical shift registers (122, 112) in parallel and selectable (e.g. with output enables) so that new binning modes could be pre-loaded. Also toggling or cycling between two or more binning modes would then be possible.

The "wired or" for the gates of the read-out switches is not absolutely necessary, since in principle all source follower outputs in a binning block ideally carry the same information (i.e. the same voltage signal). In this case, the elements 353 and 354 are not necessary. Also the pull-down device 373 can be discarded if the logic gate 372 is constructed with full driving capability (e.g. totem-pole configuration). However, activating all read-out switches in a binning block which are connected to the appropriate read-out column is useful to achieve a low output impedance and therefore a faster transfer of the voltage signal. The source followers operated in parallel can be viewed as effectively an n times "wider" transistor.

By the same argunent ("all source follower outputs carry the same information"), also the horizontal connection elements 341 and 342 may be left out.

For a practical design of an imaging sensor, mask stitching is essential to allow the fabrication of large area sensors with limited area masks. The invention is compatible with such an approach, since larger blocks can be fully repeated without any changes. One may choose to not have direct connections between neighboring pixels in adjacent stitching blocks (or even sub-blocks within a true stitching block). In this case, an appropriate choice for the size of the stitching block (or the sub-blocks) should be made to simplify the operation with many possible binning modes.

Such a simple operation is feasible when the stitching block (or sub-block) size is a multiple of the binning block width (e.g. n for n×n binning). Therefore, numbers with many factors should be chosen as the stitching block or sub-block size. For example, if 60 is chosen to be the sub-block size, then 1×1, 2×2, 3×3, 4×4, 5×5, 6×6, 10×10, 12×12, 15×15, 20×20, 30×30 and 60×60 binning are readily available (to give only the square binning block cases).

It has been described that directly deriving the diagonal address line information from the horizontal binning register is useful and allows a great flexibility already. An even higher flexibility would be possible by driving the diagonal address lines with a completely independent additional shift register. Deriving the diagonal address line information from the vertical binning register is possible in principle, too.

Not shown in FIG. 3, 5 or 6 are details of the pixel reset (via the lines 322 and the reset transistors 312, cf. FIG. 1). Another possible feature are transfer gates between the photodiodes 311 and the pixel nodes B (gate of the source follower transistor 313). Transfer gates and the associated driving lines have been omitted in all the drawings, but the invention is also fully compatible with the transfer gates.

Concerning complexity and fault tolerance it should be noted that the number of additional "components" per pixel for the preferred solution is very small (371, 372 and 373, plus optionally 341, 342, 353 and 354). For a defective read-out column (e.g. due to a line break or an amplifier fault), the resulting defect pattern for m×n binning will be only every m-th binning block missing in the vertical direction. This is a benign pattern since it commonly allows a complete correction based on interpolation.

The pixel array can be an amorphous silicon thin film device (e.g. TFT plate) or a circuit produced in crystalline silicon (e.g. CMOS device). The detector substrate would thus be a glass plate or an amorphous silicon wafer respectively. In the case of a TFT plate, the pixel circuit would not necessarily look the same as is drawn in the example due to a-Si specific considerations.

The invention is of high relevance particularly to X-ray detectors and applications in the field of medical X-ray diagnostics and intervention (Cardio, C/V, Neuro, URF, Surgery, Radiology, 3D X-ray etc.). The invention can also be used generally in the field of CMOS imagers for customer or professional applications.

Finally it is pointed out that in the present application the term "comprising" does not exclude other elements or steps, that "a" or "an" does not exclude a plurality, and that a single processor or other unit may fulfill the functions of several means. Moreover, reference signs in the claims shall not be construed as limiting their scope.

The invention claimed is:

1. An electronic device, comprising:
    an array of processing units, wherein each processing unit has an external coupling node and an internal coupling node;
    a binning circuit for selectively connecting the internal coupling nodes of several processing units each, wherein a set of coupled processing units constitutes a binning block;
    an addressing circuit for selectively addressing selected processing units;
    a number of signal lines, wherein the external coupling nodes of the processing units can selectively be connected to one of said signal lines under control of the addressing circuit in such a way that each of the signal lines is coupled to a different binning block;
    wherein the addressing circuit comprises row address lines that are connected to a selection logic in each processing unit of a corresponding row, and diagonal address lines that are connected to said selection logic in each processing unit, and wherein the selection logic is adapted to cause a connection of the external coupling node of the processing unit to a corresponding signal line if and only if both a corresponding row address line and a corresponding diagonal address line are activated.

2. The electronic device according to claim 1, wherein the processing units are radiation sensitive sensors including X-ray or light sensors, or radiation transmitters.

3. The electronic device according to claim 1, wherein the processing units are arranged in N rows and M columns, and that each signal line can selectively be connected to the processing units of a different column.

4. The electronic device according to claim 3, wherein the internal coupling nodes of the processing units of each column are connected to each other in series via a corresponding column line with switches between each pair of processing units, wherein said switches can be controlled by binning control lines running along the rows of the array.

5. The electronic device according to claim 3, wherein the internal coupling nodes of the processing units of each row are connected to each other in series via a corresponding row line with switches between each pair of processing units, wherein said switches can be controlled by binning control lines running along the columns of the array.

6. The electronic device according to claim 1, wherein the binning circuit comprises at least two sets of registers, wherein each set of registers stores a pattern of binning blocks.

7. The electronic device according to claim 1, wherein the binning circuit is further adapted to couple also the external coupling nodes of some or all processing units of a binning block.

8. The electronic device according to claim 1, wherein the binning circuit is further adapted to couple also the selection logics of processing units of the binning block that correspond to the same signal line.

9. The electronic device according to claim 1, wherein a layout of the electronic device is compatible with mask stitching.

10. An X-ray detector, comprising the electronic device according to claim 1 with X-ray sensitive processing units.

11. An examination apparatus, comprising an X-ray tube and an X-ray detector according to claim 10.

12. An image sensor, comprising the electronic device according to claim 1 with processing units that are sensitive to photons of visible light, UV and/or IR.

13. An electronic device, comprising:
    an array of processing units, wherein each processing unit has an external coupling node and an internal coupling node;
    a binning circuit for selectively connecting the internal coupling nodes of several processing units each, wherein a set of coupled processing units constitutes a binning block;
    an addressing circuit for selectively addressing selected processing units;
    a number of signal lines, wherein the external coupling nodes of the processing units can selectively be connected to one of said signal lines under control of the addressing circuit in such a way that each of the signal lines is coupled to a different binning block;
    wherein the addressing circuit comprises row address lines that are connected to a selection logic in each processing unit of a corresponding row, and diagonal address lines that are connected to said selection logic in each processing unit; and
    wherein each diagonal address line is connected to one of the binning control lines that run along columns of the array.

14. A method for accessing binning blocks with several processing units in an electronic device with an array of processing units and a set of signal lines, the method comprising the acts of:
    connecting a diagonal address line and a row address line to a selection logic of a processing unit, wherein the selection logic is adapted to cause a connection of an external coupling node of the processing unit to a signal line if and only if both the row address line and the diagonal address line are activated; and addressing the processing units such that each of the signal lines accesses a different binning block.

15. An electronic device, comprising:

processing units each having an external coupling node and an internal coupling node;

a binning circuit for selectively connecting the internal coupling node of a plurality of the processing units to form a binning block;

an addressing circuit for selectively addressing selected processing units, wherein the addressing circuit comprises a row address line and a diagonal address line; and a selection logic that receives the row address line and the diagonal address line, and wherein the selection logic is adapted to cause a connection of the external coupling node of the processing unit to a signal line if and only if both the row address line and the diagonal address line are activated.

16. The electronic device of claim 15, further comprising a controller configure to selectively connect external coupling nodes to signal lines of the processing units in such a way that each of the signal lines is coupled to a different binning block.

* * * * *